(12) United States Patent
Hou et al.

(10) Patent No.: US 10,886,052 B2
(45) Date of Patent: Jan. 5, 2021

(54) ADSORPTION BAR, VACUUM ALIGNER SYSTEM, AND CONTROL METHOD OF VACUUM ALIGNER SYSTEM

(71) Applicants: BOE TECHNOLOGY GROUP CO., LTD., Beijing (CN); Hefei Xinsheng Optoelectronics Technology Co., Ltd., Anhui (CN)

(72) Inventors: Benxiang Hou, Beijing (CN); Dahu Tang, Beijing (CN); Jun Xie, Beijing (KR)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 496 days.

(21) Appl. No.: 15/834,395

(22) Filed: Dec. 7, 2017

(65) Prior Publication Data
US 2018/0247750 A1 Aug. 30, 2018

(30) Foreign Application Priority Data
Feb. 28, 2017 (CN) .......................... 2017 1 0115486

(51) Int. Cl.
*H01F 7/20* (2006.01)
*H01F 7/16* (2006.01)
(Continued)

(52) U.S. Cl.
CPC .............. *H01F 7/20* (2013.01); *G02F 1/1303* (2013.01); *G02F 1/133516* (2013.01);
(Continued)

(58) Field of Classification Search
CPC . H01F 7/20; H01F 7/1646; H01F 7/13; H01F 2007/1866; G02F 1/133516; G02F 1/1303; G02F 1/1341
(Continued)

(56) References Cited

FOREIGN PATENT DOCUMENTS

CN 2321103 Y 5/1999
CN 102414606 A 4/2012
(Continued)

OTHER PUBLICATIONS

CN-202712149—entire specification with drawings; (Year: 2013).*
(Continued)

*Primary Examiner* — Dharti H Patel
(74) *Attorney, Agent, or Firm* — Calfee, Halter & Griswold LLP (57) ABSTRACT

The present disclosure provides an adsorption bar, a vacuum aligner system, and a control method of the vacuum aligner system. The adsorption bar includes an electromagnetic component and an adsorption member. The electromagnetic component includes a slide bar, a coil and a movable part. The coil is fixedly arranged on the slide bar. The movable part includes an elastic element and a magnet. One end of the elastic element is a fixed end which is fixedly connected to the slide bar, and the other end thereof is a free end which is connected to the magnet. The adsorption member is fixedly connected to the magnet and is exposed at one end, of the magnet, away from the coil. Current is applied to the coil to generate a magnetic field. The magnet longitudinally slides along the slide bar under a repulsive force of the magnetic field.

16 Claims, 6 Drawing Sheets

(51) Int. Cl.
    *H01F 7/13*         (2006.01)
    *H01F 7/18*         (2006.01)
    *G02F 1/1335*     (2006.01)
    *G02F 1/13*        (2006.01)
    *G02F 1/1341*     (2006.01)

(52) U.S. Cl.
    CPC ......... *H01F 7/1646* (2013.01); *G02F 1/1341* (2013.01); *H01F 7/13* (2013.01); *H01F 2007/1866* (2013.01)

(58) Field of Classification Search
    USPC .......................................................... 361/147
    See application file for complete search history.

(56) References Cited

FOREIGN PATENT DOCUMENTS

| | | |
|---|---|---|
| CN | 202712149 U | 1/2013 |
| CN | 203519958 U | 4/2014 |
| JP | H10215555 A | 8/1998 |
| JP | 2000252117 A | 9/2000 |

OTHER PUBLICATIONS

CN-2321103—entire specification with drawings; (Year: 1999).*
First Office Action for Chinese Patent Application No. 201710115486.7 dated Apr. 23, 2019.

* cited by examiner

| Input a current to the coil of each of the adsorption bars to generate a magnetic field repelling the magnet, so that the magnet drives the adsorption member to slide on the slide bar and rest on an equilibrium position | S101 |

↓

| Repeatedly adjust the value of current inputted to the coils of at least a part of the adsorption bars until all the adsorption bars have an equal length | S102 |

ADSORPTION BAR, VACUUM ALIGNER SYSTEM, AND CONTROL METHOD OF VACUUM ALIGNER SYSTEM

CROSS REFERENCE

This application is based upon and claims priority to Chinese Patent Application No. 201710115486.7, filed on Feb. 28, 2017, the entire contents thereof are incorporated herein by reference.

TECHNICAL FIELD

The present disclosure relates to the field of display panel manufacturing technologies, and more particularly, to an adsorption bar, a vacuum aligner system, and a control method of the vacuum aligner system.

BACKGROUND

In the industry of manufacturing thin film transistor-liquid crystal displays (TFT-LCDs), vacuum aligning process refers to a technology in which in a closed vacuum environment, a color filter substrate and an array substrate are respectively adsorbed by an upper base platform and a lower base platform in a vacuum aligner system (VAS), so that the color filter substrate and the array substrate are aligned to form a liquid crystal panel by means of a relative movement between the upper base platform and the lower base platform.

SUMMARY

An aspect of an embodiment of the present disclosure provides an adsorption bar, which includes an electromagnetic component and an adsorption member. The electromagnetic component includes a slide bar, and a coil and a movable part arranged on the slide bar. The coil is fixedly arranged on the slide bar. The movable part includes an elastic element and a magnet. One end of the elastic element is a fixed end, and the other end thereof is a free end. The fixed end is fixedly connected to the slide bar, and the free end is connected to the magnet. The adsorption member is fixedly connected to the magnet and is exposed at an end, of the magnet, away from the coil. Current is applied to the coil to generate a magnetic field, and the magnet longitudinally slides along the slide bar under a repulsive force of the magnetic field.

Another aspect of the embodiments of the present disclosure provides a vacuum aligner system, which includes an upper base platform and a lower base platform arranged oppositely, and a drive part arranged on the upper base platform. The vacuum aligner system further includes a plurality of adsorption bars. One end of a plurality of the adsorption bars is connected to the drive part, and the other end thereof vertically penetrates through and extends out of a lower surface of the upper base platform. A plurality of the adsorption bars are arranged in parallel and can move up and down relative to the upper base platform under a drive action of the drive part. The adsorption bar includes an electromagnetic component and an adsorption member. The electromagnetic component includes a slide bar, and a coil and a movable part arranged on the slide bar. The coil is fixedly arranged on the slide bar. The movable part includes an elastic element and a magnet. One end of the elastic element is a fixed end, and the other end thereof is a free end. The fixed end is fixedly connected to the slide bar, and the free end is connected to the magnet. The adsorption member is fixedly connected to the magnet and is exposed at an end, of the magnet, away from the coil. Current is applied to the coil to generate a magnetic field, and the magnet longitudinally slides along the slide bar under a repulsive force of the magnetic field.

Still another aspect of the embodiments of the present disclosure provides a control method of the vacuum aligner system, which includes the following steps:

inputting a current to the coil of each of the adsorption bars to generate a magnetic field repelling the magnet, so that each of the magnets drives the adsorption member to slide on the slide bar and rest on an equilibrium position; and repeatedly adjusting values of input currents of the coils of at least a part of the adsorption bars until all the adsorption bars at rest have an equal length.

Still another aspect of the embodiments of the present disclosure provides a control method of the vacuum aligner system, which includes the following steps:

inputting a current to the coil of each of the adsorption bars to generate a magnetic field repelling the magnet, so that each of the magnets drives the adsorption member to slide on the slide bar and rest on an equilibrium position;

acquiring a value of pulling force measured by each of the pressure sensors;

acquiring a difference between the value of pulling force and a standard value of pulling force to obtain an adjusted value of pulling force, wherein the standard value of pulling force is an average value of pulling force of a plurality of pressure sensors or a preset standard value;

converting each of the adjusted values of pulling force into a corresponding value of current; and adjusting values of input currents of the coils of at least a part of the adsorption bars according to each of the values of current.

BRIEF DESCRIPTION OF THE DRAWINGS

To describe the technical solutions of the embodiments of the present disclosure or that of the prior art more clearly, the accompanying drawings required for describing the embodiments or the prior art will be briefly introduced below. Apparently, the accompanying drawings in the following description are merely some embodiments of the present disclosure. To those of ordinary skills in the art, other accompanying drawings may also be derived from these accompanying drawings without creative efforts.

In the drawings, upper chamber 10; upper base platform 11; adsorption bar 12; drive rod body 121; screw 122; adsorption end 123; electromagnetic component 124; slide bar 1241; coil 1242; movable part 1243; elastic element 1244; magnet 1245; conductor 1246; adsorption member 125; pressure sensor 126; to-be-laminated color filter substrate 13; drive part 14; controller 15; lower chamber 20; lower base platform 21; support bar 22; to-be-laminated array substrate 23; elastic element fixed end a; elastic element free end b.

DETAILED DESCRIPTION

Technical solutions in the embodiments of the present disclosure will be described clearly and completely below, in conjunction with the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

In the description of the present disclosure, it is to be noted that the orientations or positions represented by the terms of "up", "down", "vertical", "horizontal", "top", "bottom", "inside", "outside", and the like are based on the accompanying figures, they are merely for ease of a description of the present disclosure and a simplified description instead of being intended to indicate or imply the device or element to have a special orientation or to be configured and operated in a special orientation. Thus, they cannot be understood as limiting of the present disclosure.

Figure 1:
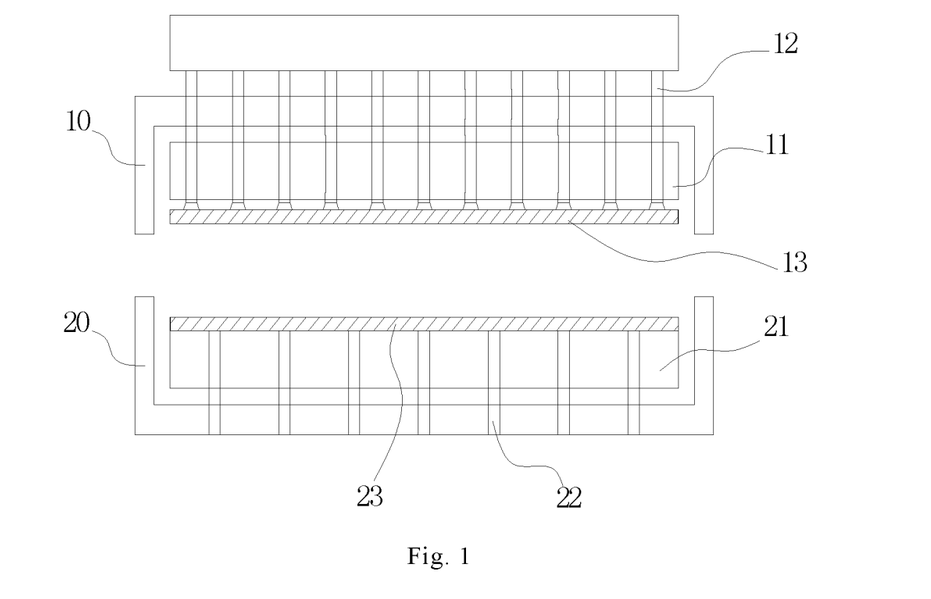
FIG. 1 is a schematic structural diagram of a vacuum aligner system.

As shown in FIG. 1, an existing vacuum aligner system typically includes an upper chamber 10 and a lower chamber 20. Edges of the upper chamber 10 and the lower chamber 20 can be mutually butted and laminated to form airtight space. In the upper chamber 10 there is provided with an upper base platform 11. On the upper base platform 11 there is provided with an adsorption bar 12. One end of the adsorption bar 12 penetrates through the upper base platform 11 and extends out downward. The adsorption bar 12 is used for adsorbing a to-be-laminated color filter substrate 13 and fixing the to-be-laminated color filter substrate 13 to a lower surface of the upper base platform 11. In the lower chamber 20 there is provided with a lower base platform 21. On the lower base platform 21 there is provided a support bar 22. The support bar 22 is used for supporting a to-be-laminated array substrate 23 and fixing the to-be-laminated array substrate 23 to an upper surface of the lower base platform 21.

Figure 2:
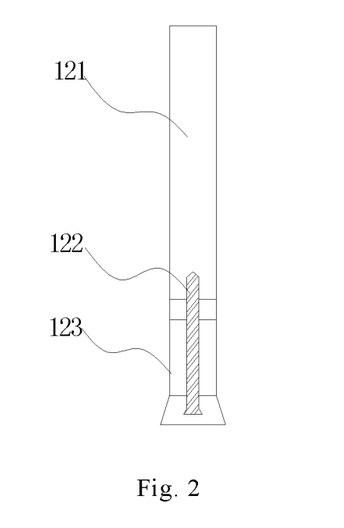
FIG. 2 is a schematic structural diagram of an adsorption bar in the vacuum aligner system as shown in FIG. 1.

As shown in FIG. 2, the existing adsorption bar 12 consists of a drive rod body 121 and an adsorption end 123 fixedly connected to the drive rod body 121 via a screw 122. The adsorption end 123 typically is designed as a bell mouth. When the to-be-laminated color filter substrate 13 is adsorbed and fixed, air in the bell mouth is removed to form vacuum so as to perform vacuum adsorption on the to-be-laminated color filter substrate 13. Next, after the vacuum airtight space is formed by aligning the upper chamber 10 and the lower chamber 20, the upper base platform 11 moves toward the lower base platform 21 under a drive action, driving the to-be-laminated color filter substrate 13 to get close to the to-be-laminated array substrate 23 until the to-be-laminated color filter substrate 13 and the to-be-laminated array substrate 23 are laminated and formed.

As liquid crystal display panels are increasingly demanding for pixels per inch (PPI), higher precision is required for vacuum aligning a color filter substrate and an array substrate. Before the aligning, flatness of the to-be-laminated color filter substrate 13 and of the to-be-laminated array substrate 23 in the vacuum aligner system has great impact on vacuum aligning precision. The higher the flatness of the to-be-laminated color filter substrate 13 and of the to-be-laminated array substrate 23 is, the higher the vacuum aligning precision is.

In the above vacuum aligner system, a certain bending deformation always exists when adsorbing the to-be-laminated color filter substrate 13 fixed to the upper base platform 11. Particularly, after the vacuum aligner system is used for long time, it is difficult to maintain consistency among a plurality of adsorption bars 12 due to long-time movement of the adsorption bars 12. Therefore, differences may be produced on degree of contact wear and degree of adsorption between each of the adsorption bars 12 and the to-be-laminated color filter substrate 13, which may cause reduction of the overall flatness of the to-be-laminated color filter substrate 13. It is difficult to discover the differences by means of visual inspection. Generally the differences cannot be determined unless a batch of defective products are produced, which is apt to cause rise of defective percentage. After it is determined that length differences among the adsorption bars 12 has a negative effect on the overall flatness of the to-be-laminated color filter substrate 13, it is required to first turn the system off to perform a detection and comparison on all the adsorption bars 12, then it is required to repair or replace the adsorption bar 12 which is severely worn and has larger length difference with the other adsorption bars 12, and then overall adjustment and test are performed on all the adsorption bars 12 before the system is restarted. Consequently, in one aspect, the production efficiency of a production line may be seriously affected once the system is shut down. In another aspect, a lot of manpower and man-hours may be consumed to detect all the adsorption bars 12 in the system, to repair or replace those malfunctioning adsorption bars 12, and to debug again all those adsorption bars 12 repaired or replaced.

Figure 3:
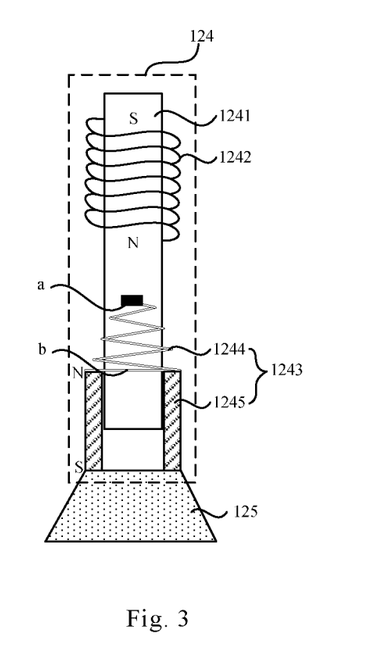
FIG. 3 is a schematic structural diagram I of an adsorption bar according to an embodiment of the present disclosure.

As shown in FIG. 3, an embodiment of the present disclosure provides an adsorption bar, which includes an electromagnetic component 124 and an adsorption member 125. The electromagnetic component 124 includes a slide bar 1241, and a coil 1242 and a movable part 1243 arranged on the slide bar 1241. The coil 1242 twined around and fixed to a periphery of the slide bar 1241. The movable part 1243 includes an elastic element 1244 and a magnet 1245. The elastic element 1244 is provided with a fixed end a and a free end b. The fixed end a is fixedly connected to the slide bar 1241, and the free end b is connected to the magnet 1245. The adsorption member 125 is fixedly connected to the magnet 1245 and is exposed at one end, of the magnet 1245, away from the coil 1242. In the event that current is applied to the coil 1242 to generate a magnetic field, the magnet 1245 slides along a longitudinal direction of the slide bar 1241 under a repulsive force of the magnetic field.

For this embodiment of the adsorption bar, the following items need to be noted.

Firstly, as shown in FIG. 3, the coil 1242 and the movable part 1243 in the electromagnetic component 124 are arranged at two opposite ends of the slide bar 1241. A relative position of the coil 1242 on the slide bar 1241 is fixed and unchanged. The fixed end a of the elastic element 1244 is fixedly connected to the slide bar 1241, and the position remains unchanged. The free end b of the elastic element 1244 is connected to the magnet 1245. Under the force of gravity, the magnet 1245 allows the elastic element 1244 to generate a certain degree of elastic deformation so that the elastic element 1244 is stretched. A stable state is reached after the force for recovering the deformation of the elastic element 1244 and the gravity of the magnet 1245 reach equilibrium, so that the magnet 1245 can steadily rest on a fixed position of the slide bar 1241.

Secondly, the slide bar 1241 generally is made from an insulating material, and the coil 1242 twining around the periphery of the slide bar 1241 forms a solenoid coil. Therefore, after a constant current is applied to the coil 1242, a magnetic field corresponding to the value of the constant current may be formed around the coil 1242 according to Ampere rule. Two ends of the coil 1242 respectively are an N-pole and an S-pole. By changing the direction of current and/or the value of current, the direction of magnetic poles at two ends of the coil 1242 and/or the magnitude of the magnetic field intensity may be correspondingly changed. The magnet 1245 also has a constant magnetic field. For example, as shown in FIG. 3, after a constant current is applied, the magnetic pole at the lower end of the coil 1242 is the N-pole. In the magnetic field of the magnet 1245, the magnetic pole at the upper end is also the N-pole. According to the principle of two like magnetic poles repelling each other, the repulsive force of the coil 1242 on the magnet 1245 may push the magnet 1245 to slide downward along the slide bar 1241. In the downward sliding process of the magnet 1245, the elastic element 1244 is further stretched and deformed. After the force for recovering the deformation of the elastic element 1244 as well as the repulsive force of the coil 1242 on the magnet 1245 and the gravity of the magnet 1245 reach force equilibrium, the magnet 1245 does not further slide downward, but again steadily rest on a fixed position of the slide bar 1241. By changing the magnitude of applied current, the repulsive force of the coil 1242 on the magnet 1245 may be changed, and correspondingly, the magnet 1245 may slide upward or downward along the slide bar 1241 until the magnet 1245 rests after reaching a force equilibrium again. Similarly, By changing the direction of applied current, the directions of the magnetic poles of the coil 1242 may be changed, so that the coil 1242 may generate an attractive force on the magnet 1245 to change the relative position between the magnet 1245 and the slide bar 1241. The principle and procedure of unlike poles attracting each other are just opposite to those of two like magnetic poles repelling each other, and thus are not unnecessarily described herein.

Thirdly, manners of generating the magnetic field of the magnet 1245 are not specifically limited by the adsorption bar according to the embodiment of the present disclosure. For example, the magnet 1245 may be made from natural magnet materials, thus having a constant magnetic field. Alternatively, similar to the coil 1242, a constant magnetic field may be formed by way of electro-magnetic conversion.

Fourthly, the adsorption member 125 is fixedly connected to the magnet 1245 and is exposed at one end, of the magnet 1245, away from the coil 1242. For example, as shown in FIG. 3, a top end of the adsorption member 125 may be directly fixed to the bottom end of the magnet 1245, or the adsorption member 125 may be fixed to the magnet 1245 in other positions, as long as it is guaranteed that the adsorption member 125 is fixedly connected to the magnet 1245 and the lower end of the adsorption member 125 is exposed at the lower end of the magnet 1245.

Figure 4:
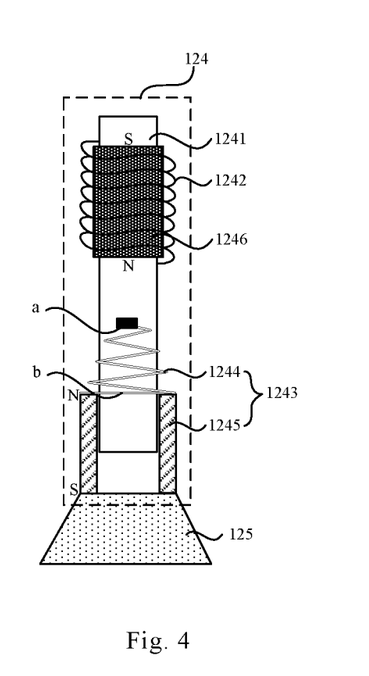
FIG. 4 is a schematic structural diagram II of an adsorption bar according to an embodiment of the present disclosure.

In an embodiment, as shown in FIG. 4, inside the coil 1242 there is further provided with a conductor 1246, which is fixedly connected to the slide bar 1241.

As shown in FIG. 4, the conductor 1246 is fixedly connected to the slide bar 1241. The coil 1242 twines around the periphery of the conductor 1246. Therefore, when a constant current is applied to the coil 1242 to generate a magnetic field around the coil 1242, the conductor 1246 can increase the magnetic field intensity of the generated magnetic field. In addition, the magnetic field intensity may be further enhanced by increasing the number of turns of the twined coil 1242, so that the magnitude of the value of applied current is reduced in the premise that the adsorption bars 12 are equal in length variation.

Figure 5:
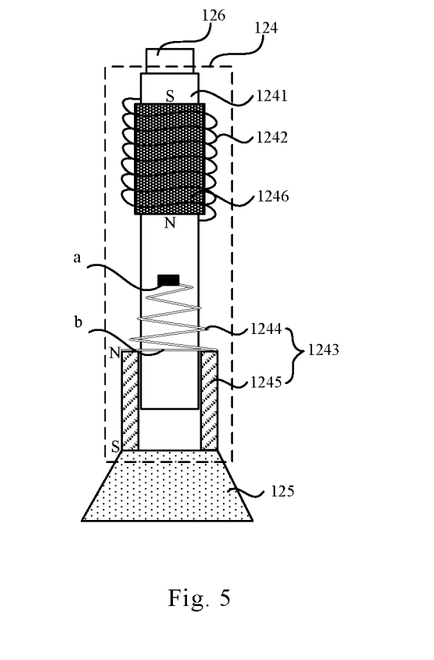
FIG. 5 is a schematic structural diagram III of an adsorption bar according to an embodiment of the present disclosure.

In another embodiment, as shown in FIG. 5, the adsorption bar 12 according to the embodiment of the present disclosure further includes a pressure sensor 126, wherein the pressure sensor 126 is arranged at one end, of the slide bar 1241, close to the coil 1242.

Figure 7:
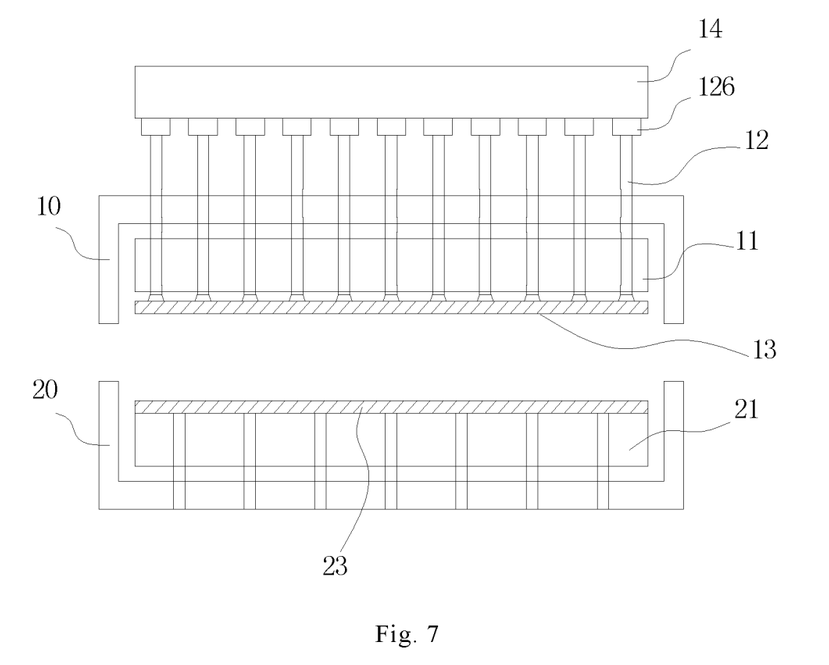
FIG. 7 is a schematic structural diagram I of a vacuum aligner system according to an embodiment of the present disclosure.

When the adsorption bar 12 according to the embodiment of the present disclosure is mounted on a drive part of the vacuum aligner system, as shown in FIG. 7, the adsorption bar 12 is connected to the drive part 14 via the pressure sensor 126. After the adsorption members 125 at the lower ends of a plurality of adsorption bars 12 jointly adsorb the to-be-laminated color filter substrate 13, the pressure sensor 126 on each adsorption bar 12 can detect a value of pulling force applied to the top end of the adsorption bar 12. The pulling force applied to the top end of the adsorption bar 12 includes a resultant force of the gravity of the adsorption bar 12 and the gravity of a part of the to-be-laminated color filter substrate 13 supported by the adsorption bar 12. When a certain adsorption bar 12 among a plurality of the adsorption bars 12 is unequal to the other adsorption bars 12 in length so that there is obvious difference between the adsorption force of the adsorption bar 12 on the to-be-laminated color filter substrate 13 in a corresponding position and the adsorption forces of the other adsorption bars 12, there is larger difference between the value of pulling force measured by the pressure sensor 126 on the adsorption bar 12 and the values of pulling force measured by the pressure sensors 126 on the other adsorption bars 12. By detecting, using the pressure sensor 126, the value of pulling force applied to the top end of the adsorption bar 12, the position state of the adsorption bar 12 can be determined, and the magnitude of repulsive force of the coil 1242 on the magnet 1245 can be changed.

Figure 6:
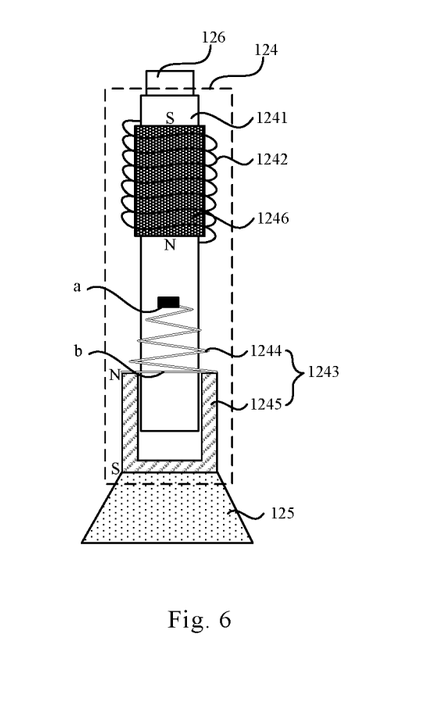
FIG. 6 is a schematic structural diagram IV of an adsorption bar according to an embodiment of the present disclosure.

Preferably, as shown in FIG. 6, the magnet 1245 is provided with at least one opening, for example, a cylindrical cavity. The magnet 1245 is sleeved on a lower end part the slide bar 1241 via the opening.

As shown in FIG. 6, in one aspect, the magnet 1245 is sleeved at the periphery of the slide bar 1241 via the opening. When force is applied to the magnet 1245, the magnet 1245 can slide up or down along the slide bar 1241.

In this way, the stability of movement is improved, and it is avoided that an impact on the movement accuracy of the magnet 1245 is caused by a drift in the transverse direction generated in the process of sliding up or down. In another aspect, the magnet 1245 is sleeved at the whole periphery of the slide bar 1241, which enhances the magnetic field intensity of the magnet 1245 compared with a case where one or more magnets are uniformly arranged at the periphery of the slide bar 1241. Furthermore, in the event that equal current is applied to the coil 1242, the magnet 1245 can move a larger distance, which further increases the amplitude of variation of length of the adsorption bar 12.

In addition, the magnet 1245 also may be designed as a structure with a hollow cylindrical sleeve. That is, on the basis of the structure where the upper end is provided with an open cylindrical cavity as shown in FIG. 6, the lower end also is provided with an open end, and the upper open end is communicated with the lower open end so that the whole magnet 1245 is hollow. In this way, materials at the bottom end part of the magnet 1245 can be saved, and gravity stretching of the elastic element 1244 is alleviated.

In an embodiment, the adsorption member 125 may include, for example, a sucker.

The sucker internally includes a cavity. When the sucker adsorbs a to-be-adsorbed article, a closed cavity is formed after an edge of the cavity of the sucker contacts a surface of the to-be-adsorbed article, and air in the closed cavity is further removed under the action of an extrusion force to form a vacuum cavity, so that negative pressure in the vacuum cavity closely adsorbs the to-be-adsorbed article and the sucker. Generally, the smoother the surface of the to-be-adsorbed article is, the higher the degree of alignment between the to-be-adsorbed article and the sucker is, the more easily the air can be extruded from the cavity, and the larger the negative pressure in the formed vacuum cavity is. The adsorption member 125 of the embodiment of the present disclosure needs to adsorb a color filter substrate of a liquid crystal display panel, and the smoother the surface of the color filter substrate is, the higher the degree of alignment between the color filter substrate and the sucker is. Therefore, in the present disclosure, the sucker is used as the adsorption member 125, which is simple in structure and good in adsorption effect.

In an embodiment, an internal surface of the sucker is coated with an adhesive layer.

To further improve the adsorption action of the sucker on the to-be-laminated color filter substrate 13 and reduce the risk of damage of the to-be-laminated color filter substrate 13 caused by falling off due to insecure adsorption, the internal surface of the sucker is coated with an adhesive layer. In this way, when the negative pressure in the vacuum cavity of the sucker adsorbs the to-be-laminated color filter substrate 13, the adhesive layer on the internal surface of the sucker also has an adsorption action on the to-be-laminated color filter substrate 13, thereby enhancing security of the to-be-laminated color filter substrate 13. Alternatively, a material having certain viscosity also may be selected as a raw material for manufacturing the sucker, so that the sucker has certain viscosity due to the property of the material.

Embodiment of the Vacuum Aligner System

As shown in FIG. 7, the vacuum aligner system according to the embodiment of the present disclosure includes an upper base platform 11 and a lower base platform 21 arranged oppositely, and a drive part 14 arranged on the upper base platform 11. In addition, the vacuum aligner system further includes a plurality of adsorption bars 12 according to the present disclosure. The upper end of the adsorption bar 12 is connected to the drive part 14, and another end thereof vertically penetrates through and extends out of the lower surface of the upper base platform 11. A plurality of the adsorption bars 12 are arranged in parallel and can move up and down relative to the upper base platform 11 under the drive action of the drive part 14.

In an embodiment, the upper end of the adsorption bar 12 is provided with a pressure sensor 126. The adsorption bar 12 is connected to the drive part 14 via the pressure sensor 126. Alternatively, in other embodiments, the pressure sensor 126 is arranged on the drive part 14, or the adsorption bar 12 also may be connected to the drive part 14 via the pressure sensor 126.

As shown in FIG. 7, when the adsorption bar 12 is connected to the drive part 14 via the pressure sensor 126, after the adsorption members 125 at the lower ends of a plurality of adsorption bars 12 jointly adsorb the to-be-laminated color filter substrate 13, the pressure sensor 126 on each adsorption bar 12 can detect a value of pulling force applied to the top end of the adsorption bar 12. The pulling force applied to the top end of the adsorption bar 12 includes a resultant force of the gravity of the adsorption bar 12 and the gravity of a part of the to-be-laminated color filter substrate 13 supported by the adsorption bar 12.

When a certain adsorption bar 12 among a plurality of the adsorption bars 12 is unequal to the other adsorption bars 12 in length so that there is obvious difference between the adsorption force of the adsorption bar 12 on the to-be-laminated color filter substrate 13 in a corresponding position and the adsorption forces of the other adsorption bars 12, there is larger difference between the value of pulling force measured by the pressure sensor 126 on the adsorption bar 12 and the values of pulling force measured by the pressure sensors 126 on the other adsorption bars 12.

For example, if a free length of an adsorption bar 12 is smaller than the lengths of the other adsorption bars 12, when a plurality of the adsorption bars 12 jointly adsorb the to-be-laminated color filter substrate 13, the adsorption force of the adsorption bar 12 on the to-be-laminated color filter substrate 13 is larger than the adsorption forces of the other adsorption bars 12 on the to-be-laminated color filter substrate 13. That is, the value of pulling force measured by the pressure sensor 126 on the adsorption bar 12 is larger than the values of pulling force measured by the pressure sensors 126 on the other adsorption bars 12, and vice versa. Therefore, By detecting, using the pressure sensor 126, the value of pulling force applied to the top end of the adsorption bar 12, the free position state of the adsorption bar 12 can be determined, and the value of current applied to the coil 1242 on the adsorption bar 12 is changed to change the magnitude of the repulsive force between the same magnetic poles so as to push the magnet 1245, and finally the length of the adsorption bar 12 is correspondingly adjusted.

In this way, the uniformity of the adsorption forces of a plurality of the adsorption bars 12 on the to-be-laminated color filter substrate 13 can be improved by adjusting the lengths of the adsorption bars 12, so that the overall flatness of the to-be-laminated color filter substrate 13 and the to-be-laminated array substrate 23 before the lamination operation is improved, and the vacuum aligning precision is improved.

After the adsorption bar 12 is adjusted, the to-be-laminated color filter substrate 13 is driven by the drive part 14 to press close to the lower surface of the upper base platform 11. After a vacuum state is formed by closing the upper chamber 10 and the lower chamber 20, the upper base platform and the to-be-laminated color filter substrate 13 adsorbed by the adsorption bar 12 jointly move downward so that a lamination operation is performed on the to-be-laminated color filter substrate 13 and the to-be-laminated array substrate 23 on the lower base platform 21.

Figure 8:
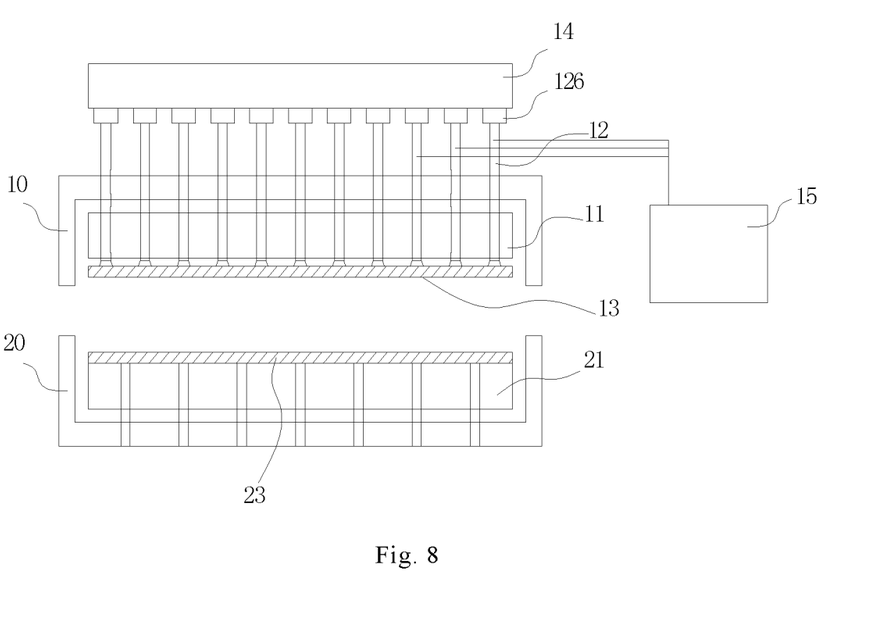
FIG. 8 is a schematic structural diagram II of a vacuum aligner system according to an embodiment of the present disclosure.

In an embodiment, as shown in FIG. 8 (in FIG. 8, to avoid too many connecting wires, only connecting wires between a controller 15 and the coils 1242 of three adsorption bars 12 are illustrated, and modes of connecting the other adsorption bars 12 and the coils 1242 are the same as those in the example), the vacuum aligner system further includes the controller 15. The coil 1242 in the electromagnetic component 124 is electrically connected to the controller 15. The controller 15 can control the value of current inputted to the coil 1242.

In this way, by controlling, via the controller 15, the current inputted to the coil 1242 in the electromagnetic component 124, the accuracy of current input can be improved, and the degree of automation of the vacuum aligner system can be improved. For example, the value of current required to be inputted may be prestored in a memory. When the vacuum aligner system according to the embodiment of the present disclosure works, the controller directly invokes prestored information from the memory, and the corresponding current is inputted to the coil 1242 in the electromagnetic component 124 to implement the operation. The memory may be an extra-arranged part having information storage function, or may be a memory unit integrated into the controller 15, and the type of the memory is not specifically limited herein.

Figure 9:
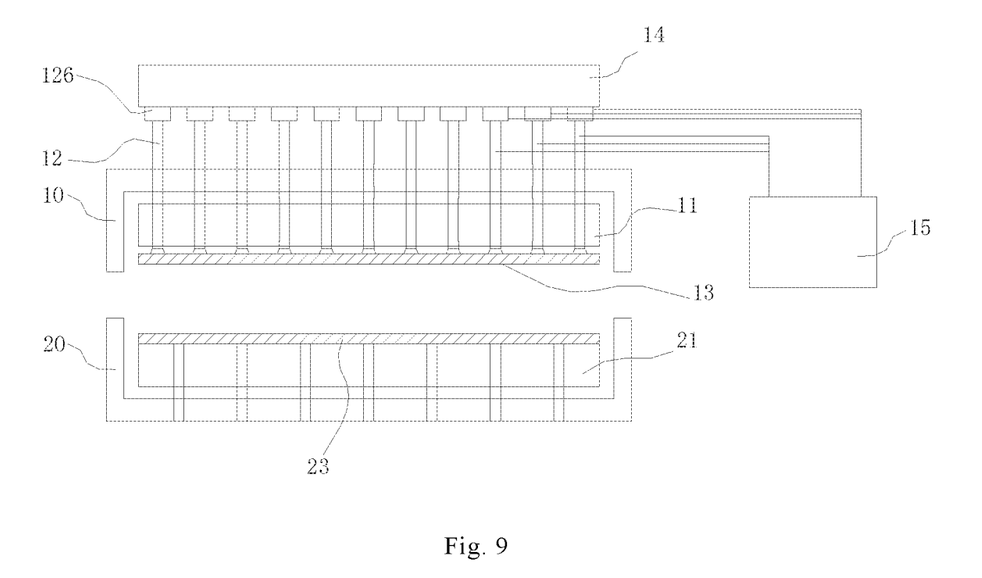
FIG. 9 is a schematic structural diagram III of a vacuum aligner system according to an embodiment of the present disclosure.

As shown in FIG. 9 (similar as shown in FIG. 8, to avoid too many connecting wires, only connecting wires between the controller 15 and the pressure sensors 126 of three adsorption bars 12 are illustrated, and modes of connecting the other adsorption bars 12 and the pressure sensors 126 are the same as those in the example), when the adsorption bar 12 includes the pressure sensor 126, the controller 15 is electrically connected to each pressure sensor 126 and is configured to receive a value of pulling force measured by the pressure sensor 126 and control a value of current inputted to the coil 1242 according to the value of pulling force.

In this way, the adsorption effects of a plurality of the adsorption bars 12 can be determined according to the value of pulling force measured by the pressure sensor 126, and differences among lengths of a plurality of the adsorption bars 12 can be reduced by correspondingly adjusting the values of current applied to the adsorption bars 12 respectively. After adjusting the values of current applied to the adsorption bars 12, the value of pulling force measured by the pressure sensor 126 may be acquired again, an adjustment effect is fed back, and the adsorption bars 12 with larger difference is correspondingly readjusted to further improve the flatness of the to-be-laminated color filter substrate 13.

Embodiment 1 of a Control Method of the Vacuum Aligner System

Figure 10:
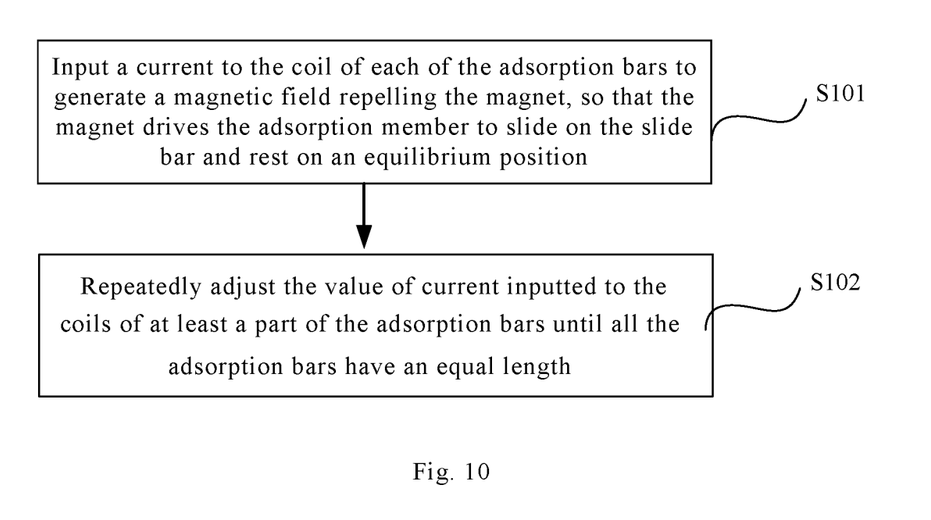
FIG. 10 is a flowchart I of a control method of a vacuum aligner system according to an embodiment of the present disclosure.

As shown in FIG. 10, the control method of the vacuum aligner system according to the embodiment of the present disclosure includes the following steps:

S101: respectively inputting a current to the coil 1242 of each adsorption bar 12 to generate a magnetic field repelling the magnet 1245, so that the magnet 1245 of each adsorption bar 12 drives the adsorption member 125 to slide on the slide bar 1241 and rest on an equilibrium position.

In the control method of the vacuum aligner system according to the embodiment of the present disclosure, to ensure the stability of the magnet 1245 under the action of a magnetic field so as to improve the reliability in adsorption of the to-be-laminated color filter substrate 13 by the adsorption bars 12 in the vacuum aligner system, merely the action of repulsive force from the homopolar magnetic poles is used, current is inputted to the coil 1242 so that the magnetic pole at a side, of the coil 1242, close to the magnet 1245 is the same as the magnetic pole at a side, of the magnet 1245, close to the coil 1242. In this way, the magnet 1245 is pushed to a side away from the coil 1242 (as shown in FIG. 6, pushed downward). When the elastic element 1244 is correspondingly stretched and deformed, after the force for recovering the deformation of the elastic element 1244 as well as the gravity of the magnet 1245 and the repulsive force applied to the magnet 1245 reach force equilibrium, a stable state is reached, and the magnet 1245 rests on a certain fixed position of the slide bar 1241.

S102: observing the length of each adsorption bar 12, and adjusting the value of current inputted to the coil 1242 of each adsorption bar 12 until each adsorption bar 12 has a consistent length.

When the values of currents inputted to the coils 1242 of the adsorption bars 12 are different, the repulsive forces of the generated magnetic field on the magnet 1245 are also different, and thus upper and lower positions of the slide bar 1241 where the magnet 1245 rests after reaching the force equilibrium are also different. In such a case, the lengths of the adsorption bars 12 may be adjusted. Subsequent adsorption actions are performed after the lengths of the adsorption bars 12 are adjusted to be consistent.

Embodiment 2 of the Control Method of the Vacuum Aligner System

Figure 11:
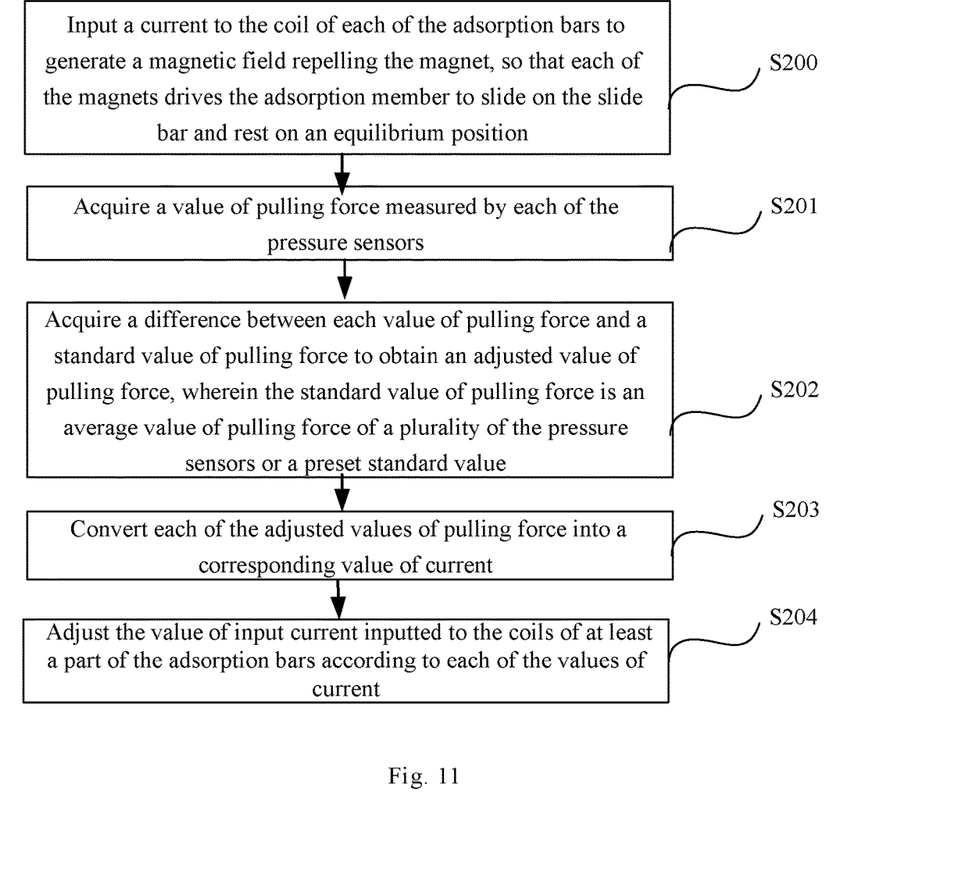
FIG. 11 is a flowchart II of a control method of a vacuum aligner system according to an embodiment of the present disclosure.

In an embodiment, as shown in FIG. 11, when the adsorption bar 12 includes a pressure sensor 126, the control method of the vacuum aligner system includes following steps:

S200: respectively inputting a current to the coil 1242 of each of the adsorption bars 12 to generate a magnetic field repelling the magnet 1245, so that the magnet 1245 of each of the adsorption bars 12 drives the adsorption member 125 to slide on the slide bar 1241 and rest on an equilibrium position;

S201: acquiring a value of pulling force measured by each of the pressure sensors 126;

S202: acquiring a difference between each value of pulling force and a standard value of pulling force to obtain an adjusted value of pulling force, wherein the standard value of pulling force is an average value of pulling force of a plurality of pressure sensors 126 or a preset standard value;

S203: converting each of the adjusted values of pulling force into a corresponding value of current; and S204: adjusting the value of input current inputted to the coil 1242 of the corresponding adsorption bar 12 according to each value of current.

For this embodiment of the control method of the vacuum aligner system, the following items need to be noted.

Firstly, in the control method of the embodiment of the present disclosure, the standard value of pulling force may be an average value of pulling force of a plurality of pressure sensors 126, or may be a preset standard value. When the standard value of pulling force is an average value of pulling force of a plurality of pressure sensors 126, after acquiring the values of pulling force measured by the pressure sensors 126, it is required to first calculate the average value of pulling force of a plurality of pressure sensors 126, and then acquire a difference between each value of pulling force and the standard value of pulling force and determine the difference as the adjusted value of pulling force. Preferably, when the standard value of pulling force is the preset standard value, it is required to prestore the standard value in a memory.

In Step S202, the controller 15 directly invokes the prestored standard value from the memory to calculate. The memory may be an extra-arranged part having information storage function, or may be a memory unit integrated into the controller 15. In this way, in one aspect, the operational processing time of the controller 15 can be reduced, and the response speed of the controller 15 can be increased. In another aspect, in case that an error occurs in detection data of the pressure sensor 126 of an individual adsorption bar 12, the impact of the error data on the accuracy of the average value of pulling force may be reduced.

Secondly, converting the adjusted value of pulling force into a corresponding value of current in Step S203 may be specifically as below: the adjusted value of pulling force may be correspondingly converted into the value of current by way of calculating according to a corresponding relationship between the adjusted value of pulling force and the value of current required to be increased or reduced, or empirical values obtained from multiple experiments are tabulated, and the adjusted values of pulling force are corresponding to the values of current by way of table look-up.

Thirdly, the value of current in Step S203 is a value of current converted from the adjusted value of pulling force. The value of current herein may be the corresponding value of current obtained by way of recalculation or table look-up, and the value of current is again inputted to the coil 1242 in the electromagnetic component 124 to adjust the magnitude of the repulsive force of the magnet 1245. Alternatively, the value of current herein also may be a changed value of current obtained by adjusting the magnitude of current on the basis of the original value of current. In this case, on the basis of the original value of input current, the value of current is directly increased or decreased. That is, the original value of input current is correspondingly increased or decreased so that the actual value of current is correspondingly changed to adjust the magnitude of the repulsive force of the magnet 1245 and each of the adsorption bars 12 is consistent in length.

Figure 12:
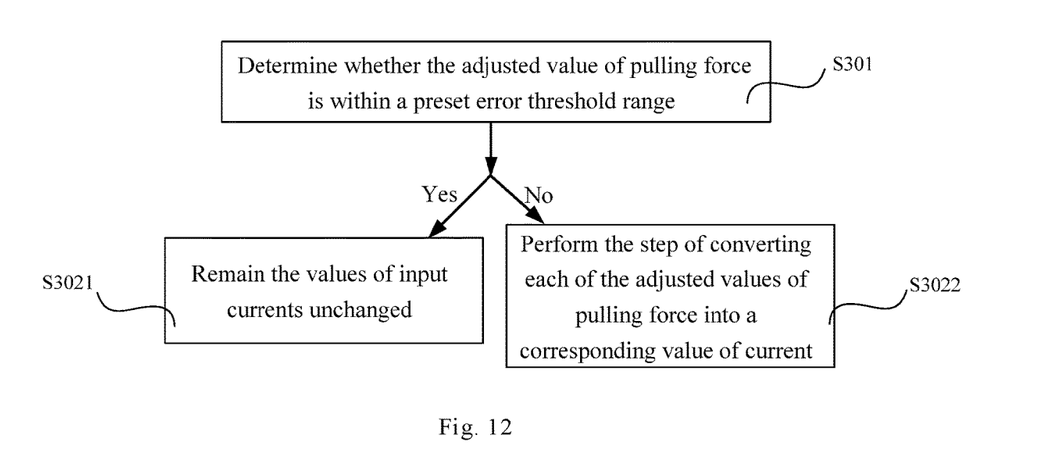
FIG. 12 is a flowchart III of a control method of a vacuum aligner system according to an embodiment of the present disclosure.

In an embodiment, as shown in FIG. 12, before the step of converting each of the adjusted values of pulling force into a corresponding value of current, the control method further includes following steps:

S301: determining whether the adjusted value of pulling force is within a preset error threshold range; and

S3021: remaining the values of input currents unchanged when the adjusted value of pulling force is within the preset error threshold range; otherwise performing the Step S203 of converting each of the adjusted values of pulling force into a corresponding value of current.

It is to be noted that the preset error threshold range refers to a whole error threshold range including a reasonable positive error range and a reasonable negative error range by taking a standard value of pulling force preset in the memory as a center.

For the adsorption bar 12 in a good running state or the adsorption bar 12 subject to at least one adjustment, after Step S202, it is determined in Step S301 whether the adjusted value of pulling force is within the preset error threshold range. When each adjusted value of pulling force is within the preset error threshold range, this indicates that each of the adsorption bars 12 has been adjusted to the equilibrium state and thus it is unnecessary to adjust again. In such a case, the magnitude of the value of input current remains unchanged and is not adjusted any more. In case that the adjusted value of pulling force is not within the preset error threshold range, this indicates that each of the adsorption bars 12 has not reached the equilibrium state yet. In such a case, the Step S203 is repeatedly performed for at least a part of the adsorption bars 12, and the adjusted value of pulling force is converted into the corresponding value of current, which is inputted to the coil 1242 to adjust the lengths of the adsorption bars 12.

As a feedback adjustment portion, the operation of this portion is repeatedly cycled for many times until all the adsorption bars 12 have reached the equilibrium state through the Step S3021.

It is also to be noted that in the adsorption bar according to the embodiment of the present disclosure, according to the electromagnetic induction principle, the electromagnetic component changes the magnetic field intensity by adjusting the magnitude of current, and the distance between the magnet 1245 and the coil 1242 is adjusted. In this way, the objective of adjusting the length of the adsorption bar 12 is achieved. However, the embodiment of the present disclosure is not limited hereto. For example, the electromagnetic component also may be replaced with an electrostrictive material. According to the properties of the electrostrictive material, the length of the electrostrictive material may be changed by changing the magnitude of the current applied, thereby achieving the objective of adjusting the length of the adsorption bar 12. For another example, the electromagnetic component also may be replaced with other deformable materials. Utilizing the corresponding relationship between change of a certain external condition and an extension change of the deformable material, the deformation of the deformable material is adjusted by changing the external condition, thereby achieving the objective of adjusting the length of the adsorption bar 12.

The embodiments of the present disclosure provide an adsorption bar, a vacuum aligner system, and a control method of the vacuum aligner system. The vacuum aligner system includes an upper base platform and a lower base platform arranged oppositely, and a drive part arranged on the upper base platform. The vacuum aligner system further includes a plurality of the adsorption bars. One end of the adsorption bar is provided with a pressure sensor and is connected to the drive part via the pressure sensor, and the other end thereof vertically penetrates through and extends out of a lower surface of the upper base platform. A plurality of the adsorption bars are arranged in parallel and can move up and down relative to the upper base platform under a drive action of the drive part. The magnetic field intensity of the magnetic field on a coil is generated and changed by applying a current to the coil in the electromagnetic component and by adjusting the magnitude of the value of the current. According to the principle of like magnetic poles repelling each other, the magnet overcomes the acting force of the elastic element under the action of the repulsive force to change the position on the slide bar. In this way, the length of the adsorption bar can be adjusted, so that the height of the to-be-laminated color filter substrate adsorbed by the adsorption member can be adjusted, and thus the overall flatness of the to-be-laminated color filter substrate can be improved.

The above is merely specific embodiments of the present disclosure, but the protection scope of the present disclosure is not limited thereto. Any variation or substitution easily conceivable to those skilled in the art shall fall into the protection scope of the present disclosure. Therefore, the protection scope of the present disclosure shall be subject to the protection scope of the claims.

What is claimed is:

1. An adsorption bar, comprising:
an electromagnetic component, comprising:
a slide bar,
a coil, fixedly arranged on the slide bar; and
a movable part, comprising an elastic element and a magnet, wherein an end of the elastic element is a fixed end, another end of the elastic element is a free end, the fixed end is fixedly connected to the slide bar, and the free end is connected to the magnet; and
an adsorption member, fixedly connected to the magnet and exposed at an end, of the magnet, away from the coil;
wherein current is applied to the coil to generate a magnetic field, and the magnet longitudinally slides along the slide bar under a repulsive force of the magnetic field,
wherein the magnet is provided with at least one opening, and is sleeved on the slide bar via the opening,
wherein the coil and the movable part are arranged at two opposite ends of the slide bar, there is a distance between the coil and the movable part.

2. The adsorption bar according to claim 1, wherein inside the coil there is further provided with a conductor, and the coil is fixedly connected to the slide bar.

3. The adsorption bar according to claim 1 further comprising: a pressure sensor, arranged at an end, of the slide bar, close to the coil.

4. The adsorption bar according to claim 1, wherein the adsorption member comprises a sucker.

5. The adsorption bar according to claim 4, wherein an internal surface of the sucker is coated with an adhesive layer.

6. A vacuum aligner system, comprising
an upper base platform and a lower base platform arranged oppositely,
a drive part arranged on the upper base platform,
a plurality of adsorption bars, wherein an end of a plurality of the adsorption bars is connected to the drive part, another end of a plurality of the adsorption vertically penetrates through and extends out of a lower surface of the upper base platform, a plurality of the adsorption bars are arranged in parallel and move up and down relative to the upper base platform under a drive action of the drive part, and the adsorption bar comprises:
an electromagnetic component, comprising:
a slide bar,
a coil, fixedly arranged on the slide bar; and
a movable part, comprising an elastic element and a magnet, wherein an end of the elastic element is a fixed end, another end of the elastic element is a free end, the fixed end is fixedly connected to the slide bar, and the free end is connected to the magnet; and
an adsorption member, fixedly connected to the magnet and exposed at an end, of the magnet, away from the coil;
wherein current is applied to the coil to generate a magnetic field, and the magnet longitudinally slides along the slide bar under a repulsive force of the magnetic field,
wherein the magnet is provided with at least one opening, and is sleeved on the slide bar via the opening,
wherein the coil and the movable part are arranged at two opposite ends of the slide bar, there is a distance between the coil and the movable part.

7. The vacuum aligner system according to claim 6, wherein inside the coil there is further provided with a conductor, and the coil is fixedly connected to the slide bar.

8. The vacuum aligner system according to claim 6 further comprising:
a controller, configured to control a magnitude of a value of current inputted to the coil.

9. The vacuum aligner system according to claim 8 further comprising:
a pressure sensor, arranged between the slide bar and the drive part, and the adsorption bar being connected to the drive part via the pressure sensor.

10. The vacuum aligner system according to claim 9, wherein the controller is configured to receive a value of pulling force measured by the pressure sensor and to control a value of current inputted to the coil according to the value of pulling force.

11. A control method of the vacuum aligner system according to claim 9, comprising following steps:
inputting a current to the coil of each of the adsorption bars to generate a magnetic field repelling the magnet, so that each of the magnets drives the adsorption member to slide on the slide bar and rest on an equilibrium position; and
acquiring a value of pulling force measured by each of the pressure sensors;
acquiring a difference between the value of pulling force and a standard value of pulling force to obtain an adjusted value of pulling force, wherein the standard value of pulling force is an average value of pulling force of a plurality of pressure sensors or a preset standard value;
converting each of the adjusted values of pulling force into a corresponding value of current; and
adjusting values of input currents of the coils of at least a part of the adsorption bars according to each of the values of current.

12. The control method according to claim 11, wherein before the step of converting each of the adjusted values of pulling force into a corresponding value of current, the control method further comprises following steps:
determining whether the adjusted value of pulling force is within a preset error threshold range; and
remaining the values of input currents unchanged when the adjusted value of pulling force is within the preset error threshold range; otherwise converting each of the adjusted values of pulling force into a corresponding value of current.

13. A control method of the vacuum aligner system according to claim 6, comprising following steps:
inputting a current to the coil of each of the adsorption bars to generate a magnetic field repelling the magnet, so that each of the magnets drives the adsorption member to slide on the slide bar and to rest on an equilibrium position; and
repeatedly adjusting values of input currents of the coils of at least a part of the adsorption bars until all the adsorption bars at rest have an equal length.

14. The control method according to claim 13, wherein inside the coil there is further provided with a conductor, and the coil is fixedly connected to the slide bar.

15. The control method according to claim 13, wherein the magnet is provided with at least one opening, and is sleeved on the slide bar via the opening.

16. The control method according to claim 13, wherein the vacuum aligner system further comprises a controller, configured to control a magnitude of a value of current inputted to the coil.

* * * * *